Jan. 2, 1968     D. FIRTH     3,360,962

FLEXIBLE COUPLING

Filed Nov. 15, 1965     2 Sheets-Sheet 1

INVENTOR.
DAVID FIRTH
BY George A. Schuind

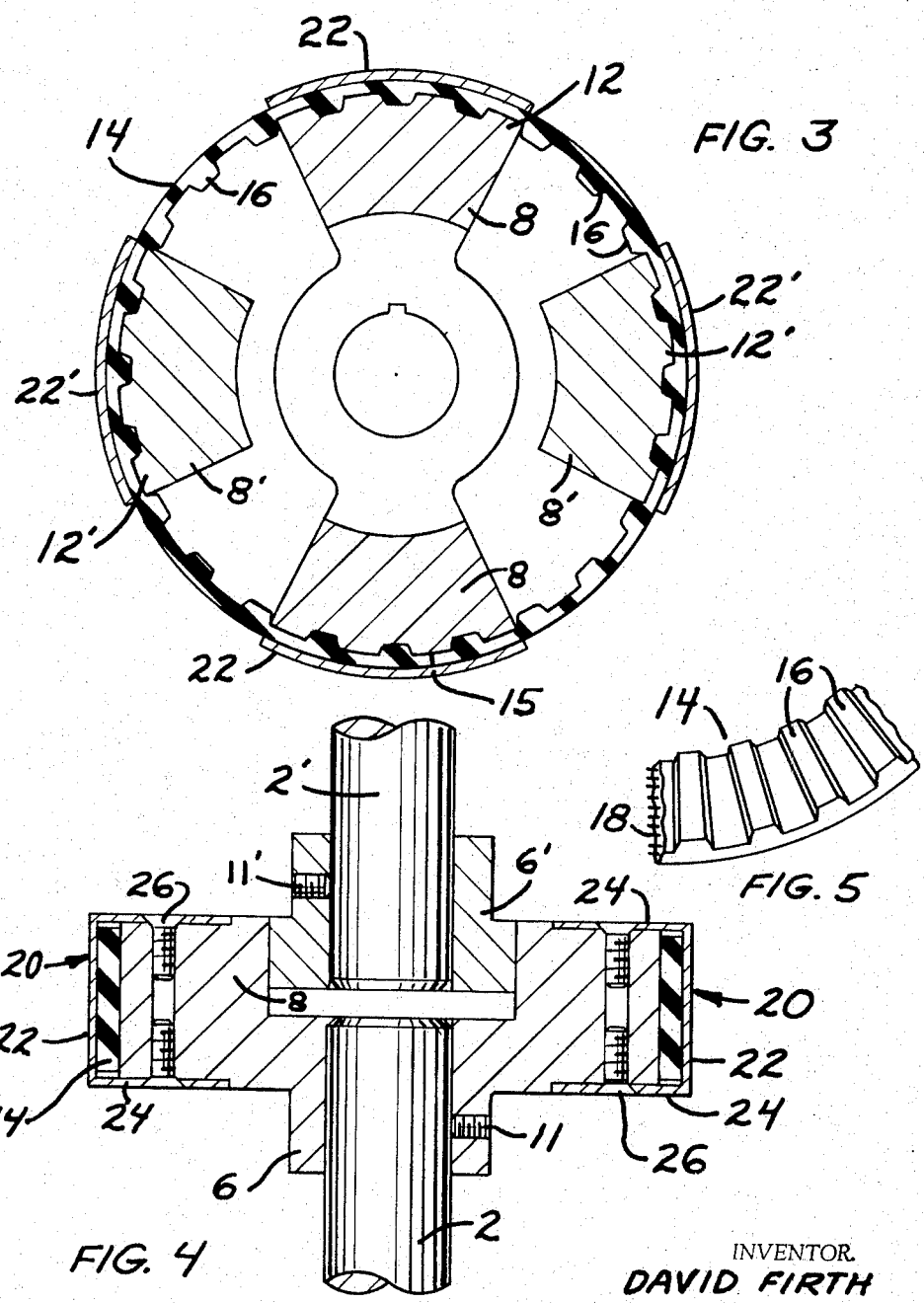

United States Patent Office 3,360,962
Patented Jan. 2, 1968

3,360,962
FLEXIBLE COUPLING
David Firth, 1441 E. Jefferson Blvd.,
South Bend, Ind. 46617
Filed Nov. 15, 1965, Ser. No. 507,865
10 Claims. (Cl. 64—11)

ABSTRACT OF THE DISCLOSURE

A flexible coupling connecting two rotatable axially positioned shafts, having two coupling members with sectors thereof interfitting and each sector having a plurality of teeth at its outer periphery, said sectors being encircled by a flexible element having internal teeth meshing with the sector teeth and held against axial and radial displacement by circumferentially spaced retainers.

---

This invention relates to couplings and in particular to flexible couplings for connecting two rotatable, axially positioned shafts whereby one shaft transmits rotation to the other shaft through a flexible means.

Conventional flexible couplings include a pair of axially aligned members which are positioned adjacent to each other and which are affixed to their respective shafts, one being the driving shaft, the other the driven shaft. Numerous types of flexible elements have heretofore been utilized for connecting the coupling members, including V-belts, tire-like elements and the like.

The invention herein disclosed relates in particular to a coupling having a flexible, yielding element having teeth on its inner periphery which mesh with corresponding teeth on the outer periphery of the coupling members to provide a driving connection between the said members. Couplings utilizing this particular type of flexible element have heretofore been limited to lower torque capacities as the flexible element would climb out of its respective grooves of the coupling members if the torque exceeds a predetermined amount, or, if sudden variations in speed occur, the element becomes disengaged from the coupling members, resulting in the breakage of the element or stripping of its flexible teeth. Also, shaft misalignment causes the unmeshing and climbing out of the flexible element from the said members so that there is only partial engagement of teeth. It is apparent that the departure of the flexible element from the coupling members is undesirable as it causes damage and subsequent breakage of the element thereby necessitating shut down of the machinery associated with the coupling for replacement of the said element.

It is the primary object, therefore, of this invention to provide a flexible coupling having a higher torque capacity for its respective size than couplings heretofore in use which utilize a flexible element having teeth formed on its inner periphery which enmesh with teeth formed on the periphery of the coupling members, and, one which is capable of withstanding flexing in all directions.

It is a further object to provide a coupling capable of withstanding appreciable end float better than couplings heretofore made without deterring the efficiency of the coupling.

It is a further object to provide a coupling which eliminates "climbing out" of the flexible element from the coupling members and also prevents any separation of the element from the said members.

Another object is to provide a coupling capable of accommodating all normal maladjustments such as angular and parallel shaft misalignment without vibration or unbalance.

A further object is to provide a coupling which allows axial movement of the flexible element but which prevents radial disenagagement of the flexible element from the coupling members.

Still another object is to provide a coupling which is capable of minimizing torsional vibrations and unbalance and which minimizes the transmission of load shocks between the coupling members.

Still another object is to provide a flexible coupling having complementary, similar, offset sectors on the coupling members which form a positive drive means, for temporary use, between the driving and driven shafts in the event of failure of the flexible element.

A further object is to provide a coupling wherein the flexible element may be split so as to facilitate replacement of the element wherein the coupling members are not disturbed on their respective shafts when replacement is being made.

Still another object is to provide a flexible coupling which is easily fabricated, readily assembled, simple to service and which has a smooth, symmetrical, exterior surface devoid of any projections, and, is efficient in operation.

These and other objects of the invention will become apparent from the following specification, which when taken in conjunction with the accompanying drawing, illustrates a preferred form fo the invention.

In the drawings:

FIG. 3 is a cross-sectional view of the coupling taken between the two coupling shafts and perpendicular thereto;

FIG. 4 is a cross-sectional view of the coupling taken on the centerline of the coupling shafts; and, FIG. 5 is an isometric view of a section of the flexible element utilized in the coupling assembly.

Figure 1:
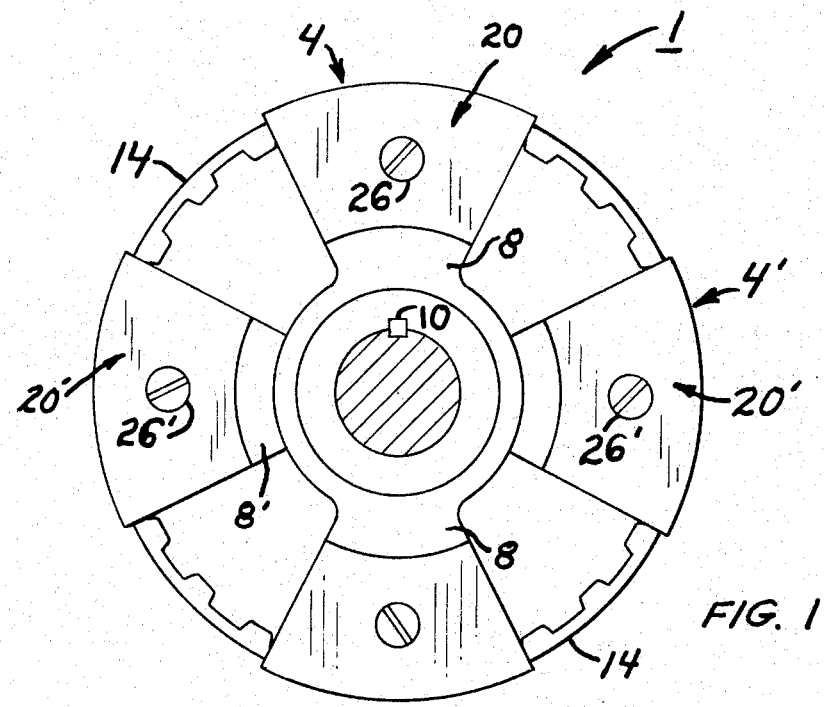
FIG. 1 is an elevational view of the flexible coupling.
Figure 2:
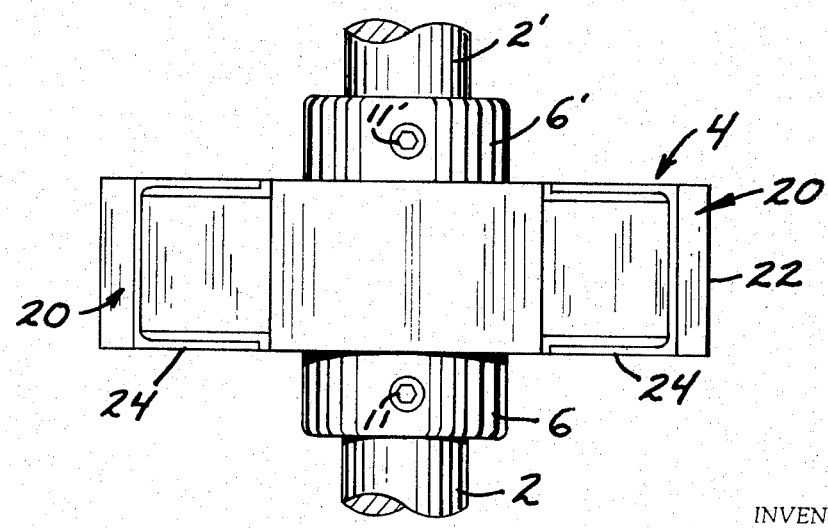
FIG. 2 is a plan view of the coupling shown in FIG. 1.

With reference to the drawing, and in particular to FIGS. 1 and 2, the coupling, generally designated as 1, consists of two separate coupling members or assemblies 4 and 4' which are mounted on driving and driven shafts 2 and 2', respectively, and are in substantial alignment with each other in end-to-end spaced apart relationship. In general application, the driving shaft 2 is normally the shaft of a power source such as an electric motor or an engine, and, the driven shaft 2' is that of a power input shaft of the device to be driven, such as a gear reducer, pump, compressor, etc. Although shafts 2, 2' are shown to be of the same diameter, these shafts may be of different diameter to accommodate the particular installation.

As the coupling members 4, 4' are identical in structure and are therefore interchangeable and adapted to be used on either the driving or driven shafts, only one coupling element will be described herein and like numbers will be used on like parts in the two coupling members, the distinction being only the use of primes to identify like parts on the other coupling members.

Each coupling member 4 includes a hub 6 having a plurality of equispaced offset sectors or projections 8 which are positioned at the outer periphery or radii of the hub. The sectors 8 are disposed parallel to and axially away from the hub 6 so as to extend toward the other coupling member. The sectors 8 overlap the shaft on which they are mounted so that the sectors 8, 8' dovetail or interfit loosely with each other when positioned on their respective shafts for operation, as shown in FIG. 4. The hub 6 is secured to its shaft by any conventional means such as a key 10, and, a set screw 11 threadedly engaged into the hub 6 to firmly hold the said key in place.

With reference to FIG. 3, the outer periphery of each sector 8 includes a plurality of teeth or grooves 12 which are parallel to the axis of the shaft 2, on which hub 6 is mounted. The teeth 12 extend the entire width of the sector, as shown in FIG. 4. The teeth 12 are formed at equidistant radial intervals, as shown, for the purpose of receiving and enmeshing with an elastomer type belted material or flexible element 14 which encircles the sectors 8, 8' and has corresponding teeth 16 projecting inwardly from its inner periphery for engagement between the teeth 12 of the sectors. Teeth 16 extend the entire width of the flexible element 14 and are formed at equidistant radial intervals, as clearly shown, along the entire inner periphery of the said element for the purpose of receiving and enmeshing between the teeth 12 of the sectors 8. FIG. 5 shows a perspective of a section of the flexible element wherein a plurality of reinforcing metallic, stranded wire or cable 18 is used to strengthen the elastic material of which the element is composed. The flexible element 14 is of conventional, belted material, of standard configuration and readily available commercially. The element 14 may be either endless or split and no variation in operation is apparent from the use of either.

To prevent the flexible element 14 from climbing out of engagement with the teeth on sectors 8, a U-shaped retaining means 20 is placed over the element so as to straddle each sector 8, as shown in FIGS. 1, 2, and 4. The retaining means 20 has an arcuate base portion 22 which is complementary in contour to the outer periphery of the sectors 8. Leg portions 24 extend from each arcuate side of the base portion 22 and are integral therewith and directed toward the axis of the shaft on which the coupling member 4 is mounted. The retaining means 20 is sector-shaped so as to have the same contour as the sectors 8, as seen in FIG. 1. Each leg portion 24 is secured to the sector which it straddles by screw means 26 which are threadedly engaged into the sectors 8 to thereby secure the leg portion 24 to the sector 8.

Attention is directed to FIG. 4 wherein flexible element 14 is shown between the teeth 12 of sectors 8 and retaining means 20 which straddles the said sectors and element. Of particular import is that the base portion 22 does not wedge or clamp the element 14 between the teeth 12 of the sector, but merely prevents the teeth of both the sector and flexible element from being separated. Hence, clearance for this must be provided for when the retaining means 20 is designed and subsequently fastened to the coupling sectors. Thus, the flexible element 14 is free to move in an axial direction with respect to the shaft on which it is mounted to thereby adjust itself to the particular installation and operational condition. However, the flexible element 14 cannot axially slide off of a sector since stop means are formed by the leg portions 24, to thereby confine the element. The capability of each coupling member 4, 4' to allow end float, and thereby adjust itself with the flexible element is of prime import and necessity as the invention disclosed herein allows this to be accomplished without any adverse effects being created in the coupling, such as unbalance, stresses or vibrations, particularly at high speeds. Also, the U-shaped retaining means 20 prevents any disengagement or separation of the teeth 12 of sectors 8, and the teeth 16 of the flexible element 14. Hence, upon assemblage of the coupling 1, which includes encircling and enmeshing of the coupling teeth 12 with the teeth 16 of the flexible element 14, it is apparent that the pitch diameter of the tooth portion of the flexible element will be equal to the pitch diameter of the tooth portion of sectors 8. And, because of the unique retaining means 20, this pitch diameter will remain constant during operation of the coupling since the flexible element is radially prevented from expanding and disengaging the respective teeth 12 and 16, a feature heretofore not present in flexible couplings. Therefore, the improved coupling disclosed herein prevents "climb out" of the flexible element during its operation, a feature desired in flexible couplings utilizing the type of flexible element herein disclosed.

When assembled in the manner shown in FIGS. 1–4, the coupling provides a connection between two shafts without maintaining direct contact. The members 4 and 4' are placed on their respective shafts and the sectors 8 are prepositioned so that they interfit or dovetail into each other at equidistant intervals. The flexible element, if of the endless type, is then slipped into position over the sectors so that the teeth 12 of the sectors 8 and the teeth 16 of the flexible element are enmeshed around the entire periphery of the coupling. The U-shaped retaining means 20 is then positioned on each sector 8 and secured thereto by screw means 26. The members are secured to their respective shafts and the coupling is ready for operation. In the event a split type flexible element is utilized, which is more convenient for replacement purposes since the element may be cut to the desired length from a strip, and, the coupling members need not be disturbed on their shafts, the sectors are first prepositioned at approximate equidistant intervals as shown. One end of the element 14 is then enmeshed with the teeth of one of the sectors approximately midway on the periphery of the sector and the element is wrapped around the sector so that the other end abuts the first end, as at 15 in FIG. 3. In this arrangement, a standard length of belt may be utilized and the excess removed. The sector containing the abutted ends of the element is then affixed with retaining means 20 and the remaining retaining means are subsequently secured.

As shown in FIG. 1, the coupling member 4 has two sectors 8. However, the coupling may operate with any plurality of sectors, such as three or four, if so desired. The only precaution be that they not abut each other during normal operation of the coupling since the two shafts 2, 2' will be directly coupled instead of flexibly coupled. For dynamic balancing reasons however, the sectors should be equispaced so they might be dovetailed into the other sectors of the complementary coupling member and be equidistant from the sectors thereof during normal operation.

It is evident from the foregoing disclosure of this invention that a coupling made in accordance therewith will perform as above set forth and will permit end float of the coupling shafts and eliminate separation of the flexible element from the coupling. Further, it will provide a coupling which reduces shearing of the teeth of the flexible element since separation of the element from the coupling is eliminated.

From the above embodiment and modification herein described and illustrated, it will be evident to those skilled in the art that various modifications may be made in the construction without departing from the principles herein set forth.

I claim:

1. A flexible coupling comprising:
  (a) a plurality of coupling members adapted for mounting on the ends of axially aligned shafts;
  (b) a plurality of offset sectors on said members directed toward each other and positioned to dovetail into each other, each sector having a plurality of teeth projecting from its outer periphery;
  (c) a flexible element encircling said members, said element having a plurality of teeth on its inner periphery adapted to enmesh with the teeth of said sectors; and,
  (d) means on each sector to retain said element from radial displacement on said sector, each means being separate from other retaining means.

2. A flexible coupling according to claim 1 wherein said means comprises a U-shaped member adapted to straddle each of said sectors, said member positioned so as to permit axial movement of said flexible element on said sector and to radially retain said element between said member and said sectors.

3. A flexible coupling according to claim 1 wherein said sectors are in circumferential alignment and wherein said means comprises a U-shaped member adapted to straddle each of said sectors, said member including an arcuate base portion positioned on said flexible element to thereby retain said element from radial displacement, leg portions integral with said base portion, said leg portions forming stop means for the axial movement of said element, and, means to secure said leg portions to said sectors.

4. A flexible coupling comprising:
(a) a plurality of like coupling members adapted for mounting on the ends of axially positioned shafts;
(b) a plurality of offset sectors on said members directed toward each other and positioned to dovetail into each other, said sectors in circumferential alignment with each other and having a plurality of equispaced teeth on its outer periphery;
(c) a flexible element encircling said offset sectors, said element having a plurality of teeth on its inner periphery enmeshing with the teeth of said sectors;
(d) circumferentially spaced means adapted to prevent separation of said element and said sectors.

5. A flexible coupling according to claim 4 wherein said means comprises a U-shaped member adapted to straddle each of said sectors to thereby prevent radial separation of said element from said sectors.

6. A flexible coupling according to claim 4 wherein said means includes a U-shaped member adapted to straddle each of said sectors, said U-shaped member comprising an arcuate base section positioned on said flexible element, said base section being of complementary contour to the outer periphery of the sector which it straddles to thereby retain said element from radial displacement, and leg portions integral with said base portion to thereby confine the axial movement of said flexible element relative to said sectors, and, means to secure said leg portions to said sectors.

7. A flexible coupling for connecting two axially positioned shafts in end to end relation comprising:
(a) a first member adapted to be secured to a shaft;
(b) a second member adapted to be secured to a second shaft;
(c) a plurality of offset sectors located on the outer radii of said first member, said sectors projecting in an axial direction toward said second member;
(d) a plurality of offset sectors located on the outer radii of said second member, said sectors projecting in an axial direction toward said first member and adapted to dovetail into the sectors of said first member, each sector on said first and second members having a plurality of teeth located on its outer periphery;
(e) a flexible element encircling said offset sectors, said element having a plurality of teeth on its inner periphery adapted to enmesh with the teeth of said sectors to thereby flexibly connect said members; and,
(f) spaced retaining means each including a pair of leg portions straddling one of said sectors, said leg portions permitting axial movement of said element therebetween, and, a base portion integral with said leg portions adapted to retain said element from radial displacement.

8. A flexible coupling according to claim 7 wherein said base portion is of arcuate configuration complementary to the outer periphery of the sector on which it is positioned and wherein said sectors are in circumferential alignment with each other, and, means to secure said leg portions to their respective sectors.

9. A flexible coupling according to claim 8 and further including means to secure said members to their respective shafts and wherein said teeth on said flexible element and said sectors are positioned parallel to the shafts on which said members are secured.

10. A flexible coupling according to claim 4 wherein said flexible element is of the split type and wherein the ends thereof are positioned at a point on the outer periphery of one of said sectors.

References Cited
UNITED STATES PATENTS

| | | | |
|---|---|---|---|
| 2,655,798 | 10/1953 | Neher | 64—19 X |
| 2,740,271 | 4/1956 | Beher | 64—19 X |
| 2,778,663 | 1/1957 | Prevost | 64—12 X |
| 2,867,102 | 1/1959 | Williams | 64—13 X |
| 2,924,082 | 2/1960 | Reich | 64—13 |

FOREIGN PATENTS 524,440  8/1940  Great Britain.

MILTON KAUFMAN, *Primary Examiner.*

HALL C. COE, *Examiner.*